Sept. 9, 1941.  H. LOOS  2,255,566

TORQUE TRANSFORMER

Filed Nov. 25, 1939  2 Sheets-Sheet 1

Inventor
Hans Loos
By [signature] Atty.

Sept. 9, 1941.     H. LOOS     2,255,566
TORQUE TRANSFORMER
Filed Nov. 25, 1939     2 Sheets-Sheet 2

Inventor
Hans Loos
Atty.

UNITED STATES PATENT OFFICE 2,255,566

TORQUE TRANSFORMER

Hans Loos, Vienna, Germany, assignor to Albert Gerngross, Zurich, Switzerland

Application November 25, 1939, Serial No. 306,203
In Switzerland December 1, 1938

3 Claims. (Cl. 74—64)

The invention relates to a torque transformer and consists in a body liable to be actuated by a driving part being connected with the driven part in such a way that upon starting the movement the progress of the body's movement, owing to the resistance operating upon the driven part, is hemmed till a common equal speed is reached, the braking way decreasing as the braking resistance increases, and an automatical regulation of the ratio of the spaces covered by both the driving and the driven part ensuing in dependance of the forces operating on them.

To overcome the resistance operating upon the driven part there is provided transmitting bodies for generating kinetic energy, capable of rotating with the driving part and thereby guided radially. For elimination of the reaction exerted on the load shaft during the development of the kinetic energy by the transmitting bodies, a coupling device is provided. Through this device the torque furnished by the driving motor is divided into two oppositely directed torques, one being transmitted without losses to the driven part and the other used to store kinetic energy for the next working step. In the known constructions of this type the storing of the kinetic energy takes place by stretching springs, whereby an unhemmed movement of the transmitting bodies ensues only in the first part of their movement—that is, as long as the stretching of the springs is still small.

The invention consists in that a coupling is provided which allows an unhemmed motion of the transmitting bodies when storing kinetic energy for the next working step. This is attained by providing a jointed connection between the driven and the loaded part.

The device, according to the present invention is much simplified over prior known constructions. Whereas said known constructions provide two separate and oppositely operating over-running one-way clutches, but one eccentric crank device is necessary according to the present invention for all purposes for forward and backward movement. Tests have shown that a continuous action of the over-running one-way clutches is not possible, owing to the limited possibility of dimensioning the same and owing to the bursting and wedge effect. It is impossible to follow with the over-running one-way clutches the rapidly changing impulses, and, furthermore, owing to the multiplication of the attacks of force, the wear is high and the life is decreased.

On the contrary, the equalizer according to the present invention, is a device free from objection from a technical standpoint, and has been under test many thousands of times in internal combustion engines. The additional devices, that is, the necessary parts of the structure which are used in the known construction to avoid extraordinary great attacks of force and jams of the over-running clutches, are superfluous in the construction according to the present invention.

Figure 1:
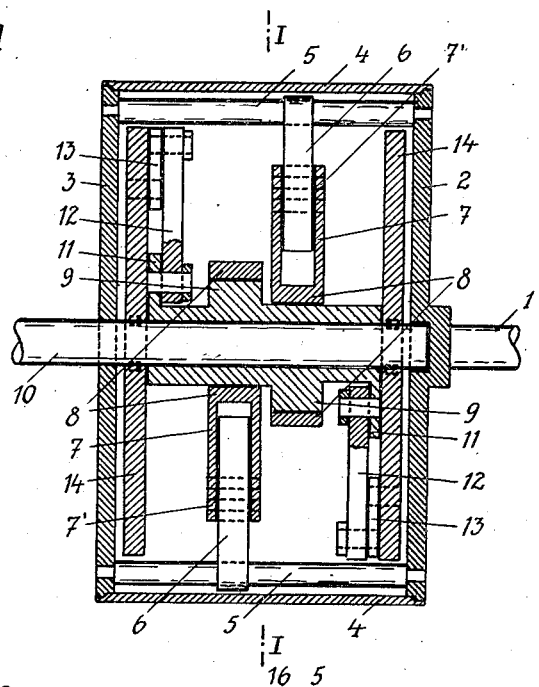
Figure 1 is an axial section of the device according to the present invention.
Figure 2:
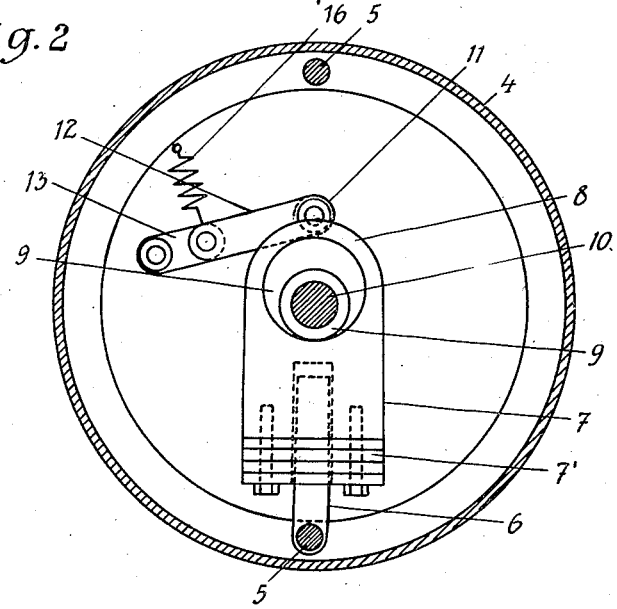
Figure 2 is a section on the line 2—2 of Figure 1.
Figure 3:
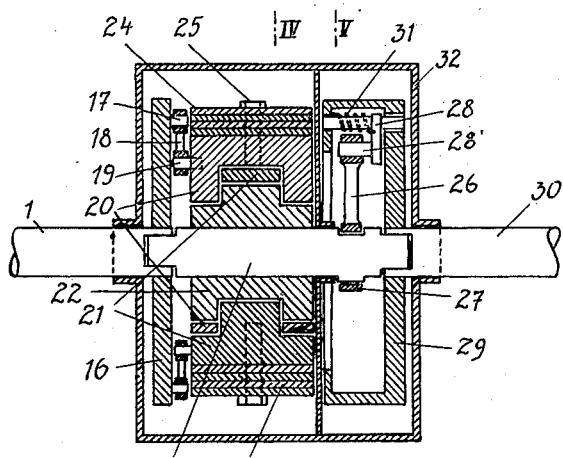
Figure 3 is a section on the line 3—3 of Figure 1.
Figures 4, 5:
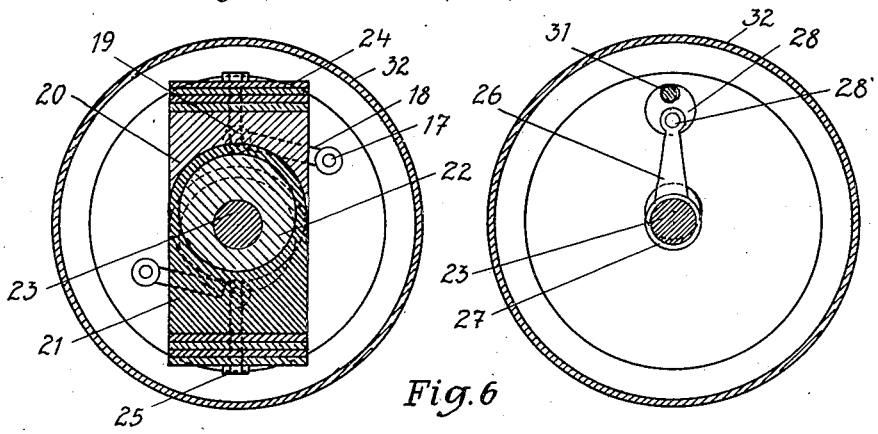
Figure 6:
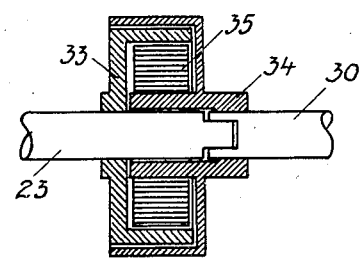

On the driving shaft 1 the driving pulley 16 is secured, whose bolts 17 by means of the steering arms 18 and the bolts 19 engage the working bodies 20 and 21. In doing this the steering arms 18 not only serve as engaging parts but also help radially to guide the working bodies 20, 21. These latter are mounted on the excentrical pulleys 22 connected with the countershaft 23. The working bodies carry the plates (lamelles) 24 fixed by means of the screw bolts 25. The number of these working bodies may be varied according to the mass of work desired. On the eccentrical counter-shaft 23 there is secured the ring 27 with its connecting rods 26 connected, with its other end, with the free crank shaft 28' of the crank 28. The crank 28 is mounted within the fly-wheel 29 fixed with respect to the load shaft 30. The deflection of the crank 28 from its dead point position is aided by the spring 31. The device specified is accommodated within the casing 32. Its operation is as follows:

On the driving shaft 1 being rotated, the working bodies 20 and 21 are engaged by the steering arms 18 tending to move radially outward. During this outward movement toward the upper dead center, centrifugal kinetic energy is developed, which is the developing cycle. By this the eccentric disc 22 is moved crank-like from the lower to the upper dead point position, in a sense, to the driving direction. In order to permit the unhampered movement of the working bodies required for the development of kinetic energy and in order to eliminate any influence of this kinetic energy on the driven shaft, opposite to the direction of rotation to be obtained, the coupling 26, 28' and 28 is provided. The latter prevents the eccentric from reacting in the manner described on the load shaft—that is, in the opposite direction, by leaving on the retrogressive movement of the eccentric disc 22 its extended position (see Figure 3) in which eccentric disc 23 it is connected with the pulley 29 or with the load shaft 30 and engages the latter, the pull of the spring 31 assisting in the movement. Until the extended position of both the parts 26 and 28 is again reached due to the lead of the driving member on the driven one, the joint between 26 and 28 will bend over, the load shaft will be disconnected from the driving part, and the kinetic energy stored in the working bodies 20, 21 during their unrestricted outward movement, liable to operate on the driven shaft 30 as soon as the extended coupling position is reached again. The greater the braking resistance operating on the driven shaft 30 created by the influence of the load, and restricting the working bodies 20, 21, the shorter the braking space—that is, the lesser the number of revolutions through which the working bodies are carried back into the first mentioned initial position and the greater the difference of space created in the movement between the driving and the driven member. When the difference of the forces actuating the driven and driving part and opposing each other becomes zero, the working bodies remain stationary in the summit of their working space, that is, in the outward limit of their working position, and the whole device rotates as a single unit.

Although the bulk of the working bodies and the load pulleys has a balancing effect between the two working cycles (power developing and consumption cycle), the uniform movement may also be attained by coupling two units working in alternating cycles.

The scope of use of the torque transformer as specified in the invention is a very wide one, being applicable wherever care must be taken to adapt the driving power to varying load resistances. Owing to the absence of cog-wheels and frictional parts, as well as to the possibility of using roller bearings between any surfaces rotating with different speeds, there results a high efficiency and small wear.

I claim:

1. A torque transformer comprising a member to be actuated by a driving part and connected with a driven part so that upon starting the movement, the member is restricted in its forward movement owing to the resistance operating upon the driven part, transmitting bodies for generating kinetic energy to overcome the resistance, capable of operating with the driven part and guided radially, a jointed arm hinged on the one side to the driving pulley and on the other side to the transmitting body, and a jointed connection between the driven and loaded parts.

2. A torque transformer comprising a member to be actuated by a driving part and connected with a driven part that upon starting the movement, the member is restricted in its forward movement owing to the resistance operating upon the driven part, transmitting bodies for generating kinetic energy to overcome the resistance and capable of rotating with the driven part, and guided radially, a jointed arm hinged on the one side to a driving pulley and on the opposite side to the transmission body, a connecting rod joined on the one side to an eccentric of a counter-shaft arranged between the driving and the driven part, and on the other side hinged to a free crank-pin of a crank attached to a fly-wheel fixed to the load shaft.

3. A construction as defined in claim 2 including a torsion spring connected to the jointed connection to aid the deflection of the crank from its dead point position.

HANS LOOS.